(12) United States Patent
Kazem et al.

(10) Patent No.: US 11,308,665 B2
(45) Date of Patent: Apr. 19, 2022

(54) AUTOMATIC GENERATION OF USER ONBOARDING TOURS FOR BUSINESS ANALYTIC APPLICATIONS

(71) Applicant: International Business Machines Corporation, Armonk, NY (US)

(72) Inventors: Firas Kazem, Kanata (CA); Peter Djeneralovic, Stoney Creek (CA); Aly Gemae, Ottawa (CA)

(73) Assignee: International Business Machines Corporation, Armonk, NY (US)

(*) Notice: Subject to any disclaimer, the term of this patent is extended or adjusted under 35 U.S.C. 154(b) by 77 days.

(21) Appl. No.: 16/776,748

(22) Filed: Jan. 30, 2020

(65) Prior Publication Data
US 2021/0241507 A1 Aug. 5, 2021

(51) Int. Cl.
*G06T 11/20* (2006.01)
*G06F 40/237* (2020.01)
*G06Q 10/06* (2012.01)
*G06F 16/904* (2019.01)
*G06F 3/04842* (2022.01)

(52) U.S. Cl.
CPC ........ *G06T 11/206* (2013.01); *G06F 3/04842* (2013.01); *G06F 16/904* (2019.01); *G06F 40/237* (2020.01); *G06Q 10/063* (2013.01)

(58) Field of Classification Search
CPC . G06F 3/04842; G06F 40/237; G06Q 10/063; G06T 11/206
See application file for complete search history.

(56) References Cited

U.S. PATENT DOCUMENTS

| 7,885,918 | B2 | 2/2011 | Statchuk |
| 8,182,270 | B2 | 5/2012 | Elzinga et al. |
| 10,192,175 | B2 * | 1/2019 | Blyumen ............ G06F 3/04842 |
| 2007/0224585 | A1 | 9/2007 | Gerteis et al. |

(Continued)

OTHER PUBLICATIONS

Sjober et al., "Designing the user onboarding process in analytics software; Taking an omnichannel perspective," Master's thesis in Interaction Design, Chalmers University of Technology, Gothenburg, Sweden, 2017, 152 pages.

(Continued)

*Primary Examiner* — Jin Cheng Wang
(74) *Attorney, Agent, or Firm* — Yee & Associates, P.C.

(57) ABSTRACT

Automatically generating an onboarding tour for a business analytic application is provided. Columns of a dataset used by the business analytic application are analyzed. Characteristics of visualizations of the business analytic application are analyzed. Ordered groups of visualizations corresponding to the business analytic application are generated based on a result of analyzing the columns of the dataset used by the business analytic application and the characteristics of the visualizations of the business analytic application. A set of visualization paths corresponding to the business analytic application is generated based on the ordered groups of visualizations. Visualization paths in the set of visualization paths corresponding to the business analytic application are ordered to form the onboarding tour based on the result of analyzing the columns of the dataset used by the business analytic application and the characteristics of the visualizations of the business analytic application.

17 Claims, 10 Drawing Sheets

(56) References Cited

U.S. PATENT DOCUMENTS

| | | | |
|---|---|---|---|
| 2011/0208603 A1 | 8/2011 | Benefield et al. | |
| 2013/0091465 A1* | 4/2013 | Kikin-Gil | G06F 9/451 |
| | | | 715/817 |
| 2014/0095396 A1* | 4/2014 | Naghshin | G06Q 10/103 |
| | | | 705/301 |
| 2014/0282013 A1* | 9/2014 | Amijee | G06F 3/0482 |
| | | | 715/732 |
| 2015/0177964 A1* | 6/2015 | Spirer | G06F 16/4393 |
| | | | 715/732 |
| 2015/0309714 A1* | 10/2015 | Blyumen | G06Q 10/063 |
| | | | 715/753 |
| 2016/0086361 A1* | 3/2016 | Ball | G06T 11/206 |
| | | | 345/440 |
| 2016/0092408 A1* | 3/2016 | Lagerblad | G06F 40/106 |
| | | | 715/243 |
| 2016/0124909 A1* | 5/2016 | Basson | G06F 3/048 |
| | | | 715/732 |
| 2016/0274781 A1* | 9/2016 | Wilson | G06T 11/206 |
| 2017/0024674 A1* | 1/2017 | Lerena | G06Q 10/04 |
| 2017/0052652 A1* | 2/2017 | Denton | G06F 16/248 |
| 2017/0154026 A1* | 6/2017 | Gong | G06T 11/206 |
| 2018/0107632 A1* | 4/2018 | Blinn | G06F 16/9577 |
| 2018/0174060 A1* | 6/2018 | Velez-Rojas | H04W 4/02 |
| 2018/0330248 A1* | 11/2018 | Burhanuddin | G06N 20/10 |
| 2020/0012986 A1* | 1/2020 | Clark | G06Q 10/067 |
| 2020/0125559 A1* | 4/2020 | Talbot | G06F 16/289 |
| 2021/0224328 A1* | 7/2021 | Schrupp | G06F 16/904 |

OTHER PUBLICATIONS

Soni et al., "Method and System for Mining Dynamically Related Vibes for Applications in Recommendation and User Onboarding," An IP.com Prior Art Database Technical Disclosure, IPCOM000254698D, Jul. 23, 2018, 6 pages.

Stoiber et al., "Visualization Onboarding: Learning How to Read and Use Visualizations," Preprint, Aug. 2019, 6 pages.

Hucko et al., "YesElf: Personalized Onboarding for Web Applications," Demo and Late-breaking Results, UMAP'19 Adjunct: Adjunct Publication of the 27th Conference on User Modeling, Adaptation and Personalization, Jun. 9-12, 2019, Larnaca, Cyprus, pp. 39-44.

IBM Disqus, "Explorations," accessed Jan. 30, 2020, 5 pages. https://www.ibm.com/support/knowledgecenter/en/SSEP7J_11.1.0/com.ibm.swg.ba.cognos.ca_new.doc/c_ca_nf_11_1_explorations.html.

* cited by examiner

AUTOMATIC GENERATION OF USER ONBOARDING TOURS FOR BUSINESS ANALYTIC APPLICATIONS

BACKGROUND

1. Field

The disclosure relates generally to business analytic applications and more specifically to automatically generating onboarding tours for users of business analytic applications to assist users in understanding the data analysis provided by the business analytic applications.

2. Description of the Related Art

Business analytic applications refer to a type of software that continuously analyzes business performance to gain insight and drive business planning. Business analytic applications focus on developing new insights and understanding business performance based on collected data and statistical methods. Business analytic applications make use of analytical modeling and numerical analysis, which includes explanatory and predictive modeling and fact-based analysis to drive decision making. Business analytic applications can answer questions, such as, why is this happening, what if these trends continue, what will happen next (i.e., make predictions), and what is the best possible outcome (i.e., recommend optimizations).

SUMMARY

According to one illustrative embodiment, a computer-implemented method for automatically generating an onboarding tour for a business analytic application is provided. A computer analyzes columns of a dataset used by the business analytic application. The computer analyzes characteristics of visualizations within the business analytic application. The computer generates ordered groups of visualizations corresponding to the business analytic application based on a result of analyzing the columns of the dataset used by the business analytic application and the characteristics of the visualizations of the business analytic application. The computer generates a set of visualization paths corresponding to the business analytic application based on the ordered groups of visualizations. The computer orders visualization paths in the set of visualization paths corresponding to the business analytic application to form the onboarding tour based on the result of analyzing the columns of the dataset used by the business analytic application and the characteristics of the visualizations of the business analytic application. According to other illustrative embodiments, a computer system and computer program product for automatically generating an onboarding tour for a business analytic application are provided.

DETAILED DESCRIPTION

Figure 1:
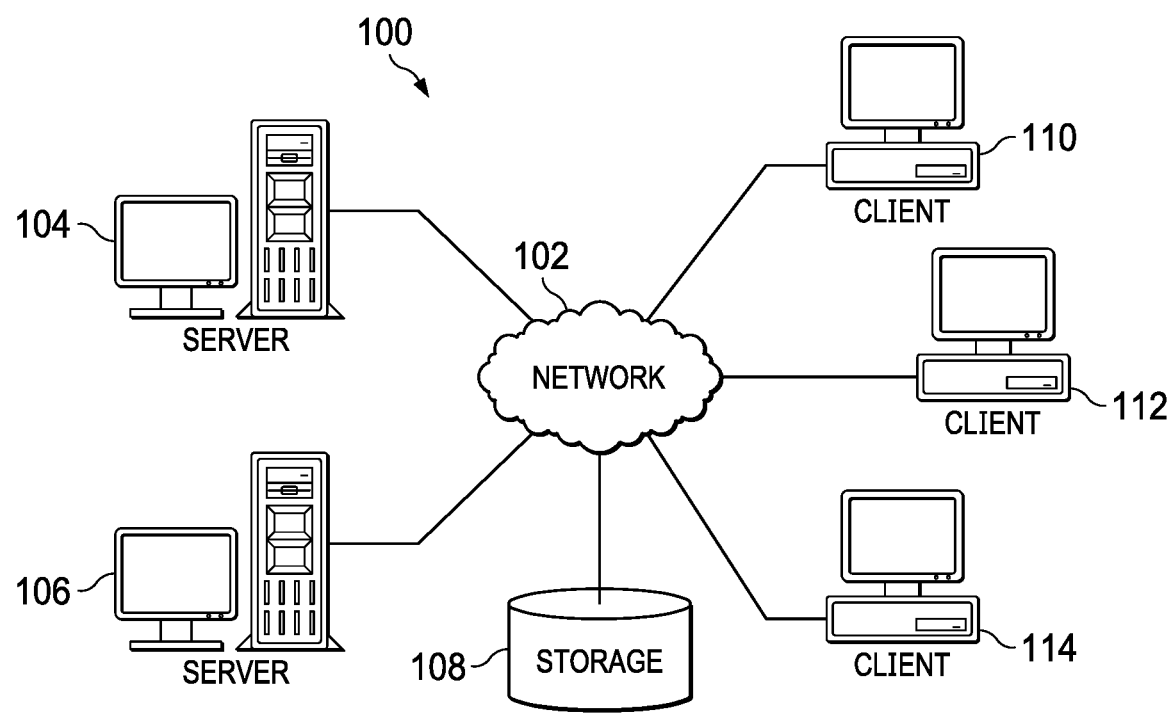
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
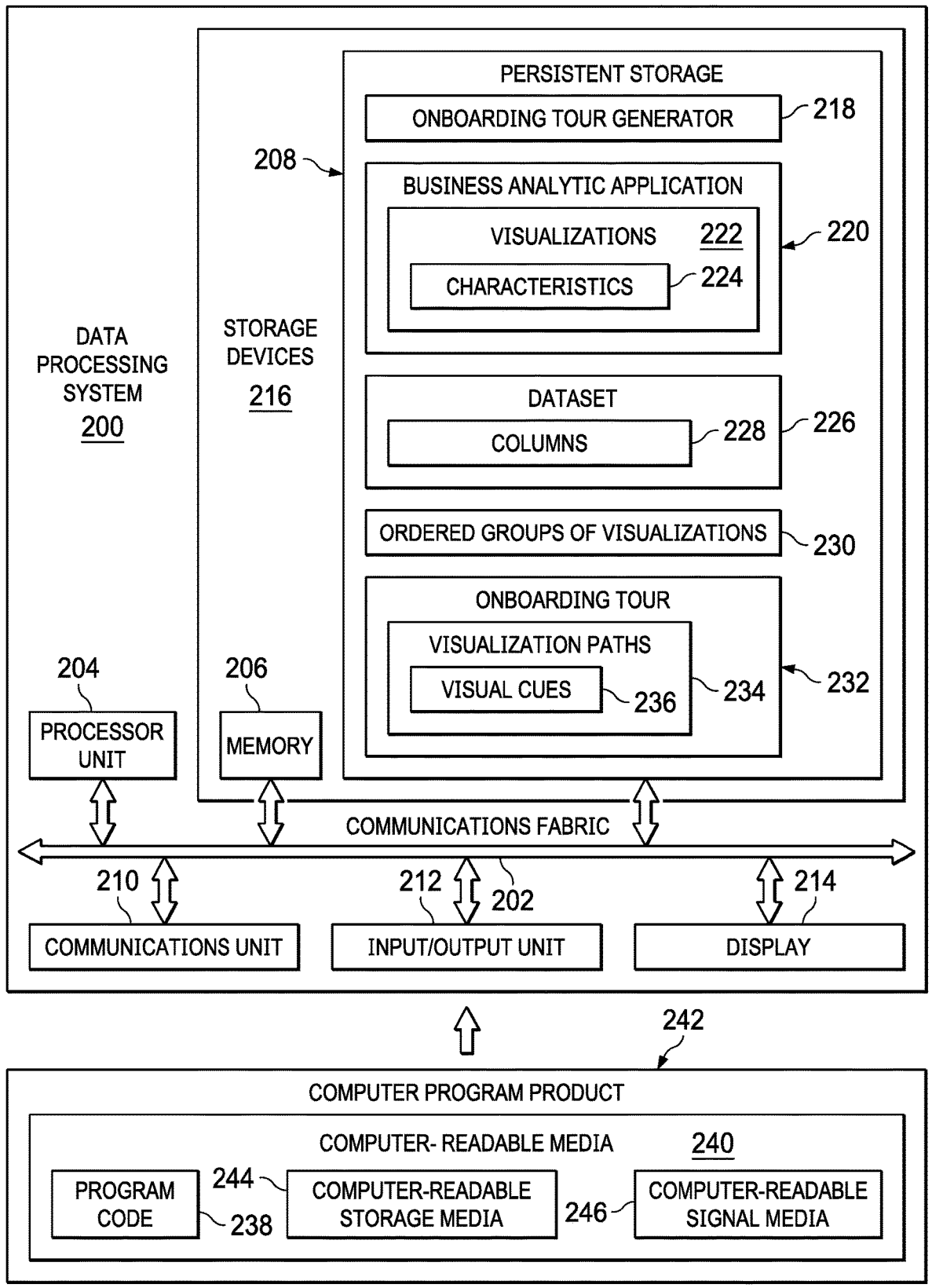
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 provide a service that automatically generates custom onboarding tours for users of business analytic applications corresponding to one or more entities, such as, for example, companies, enterprises, organizations, institutions, agencies, and the like. The business analytic applications may be any type of analytics software for any type of venture. Also, it should be noted that server 104 and server 106 may each represent a cluster of servers in one or more data centers. Alternatively, server 104 and server 106 may each represent computing nodes in one or more cloud environments.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, laptop computers, handheld computers, smart phones, smart televisions, kiosks, and the like, with wire or wireless communication links to network 102. Users of clients 110, 112, and 114 may utilize clients 110, 112, and 114 to view the business analytic application with the custom onboarding tours generated by server 104 and server 106.

Storage 108 is a network storage device capable of storing any type of data in a structured format or an unstructured format. In addition, storage 108 may represent a plurality of network storage devices. Further, storage 108 may store identifiers and network addresses for a plurality of different client devices, identifiers for a plurality of different client device users, a plurality of different business analytic applications, datasets corresponding to the plurality of different business analytic applications, and the like. Furthermore, storage 108 may store other types of data, such as authentication or credential data that may include user names, passwords, and biometric data associated with system administrators and client device users, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis or a persistent basis. Further, a computer readable storage device excludes a propagation medium. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above.

The media used by persistent storage 208 may be removable. For example, a removable hard drive may be used for persistent storage 208.

In this example, persistent storage 208 stores onboarding tour generator 218. However, it should be noted that even though onboarding tour generator 218 is illustrated as residing in persistent storage 208, in an alternative illustrative embodiment onboarding tour generator 218 may be a separate component of data processing system 200. For example, onboarding tour generator 218 may be a hardware component coupled to communication fabric 202 or a combination of hardware and software components. In another alternative illustrative embodiment, a first set of components of onboarding tour generator 218 may be located in data processing system 200 and a second set of components of onboarding tour generator 218 may be located in a second data processing system, such as, for example, server 106 or client 110 in FIG. 1. In yet another alternative illustrative embodiment, onboarding tour generator 218 may be located in the client device in addition to, or instead of, data processing system 200.

Onboarding tour generator 218 controls the process of automatically generating an onboarding tour for users of business analytic application 220 to assist the users in understanding the data analysis provided by business analytic application 220. Business analytic application 220 may represent any type of business analytic application. In addition, business analytic application 220 corresponds to a particular type of entity, such as, for example, a healthcare entity.

Business analytic application 220 includes visualizations 222. Visualizations 222 represent a plurality of different visualizations that represent data corresponding to columns 228 of dataset 226. A visualization may be, for example, a diagram, chart, graph, table, graphic, map, image, text, or any combination thereof, which illustrates information contained in a particular column, such as, for example, a "revenue" column, of dataset 226. Dataset 226 represents a collection of data corresponding to a particular domain, such as, for example, a healthcare domain, associated with the entity that corresponds to business analytic application 220. Columns 228 of dataset 226 represent a plurality of different columns of data contained in dataset 226, which is stored in a relational, tabular, or rectangular format, for example.

Further, visualizations 222 include characteristics 224. In other words, each visualization has a set of characteristics, attributes, or features associated with it. For example, characteristics 224 may include a particular visual layout, a particular visual style (e.g., color scheme or background), visualization positioning, visualization interactivity, visualization grouping, and the like.

Onboarding tour generator 218 may retrieve business analytic application 220 and dataset 226 from storage, such as, for example, storage 108 in FIG. 1, in response to receiving an input to generate onboarding tour 232 for business analytic application 220. After retrieving business analytic application 220 and dataset 226, onboarding tour generator 218 analyzes characteristics 224 of visualizations 222 and columns 228 of dataset 226 to generate ordered groups of visualizations 230. Ordered groups of visualizations 230 represent specific groups of visualizations. Onboarding tour generator 218 generates the different groups of visualizations and orders the visualizations within each respective group of visualizations based on a result of analyzing the visualization characteristics and dataset columns associated with each particular group of visualizations.

Onboarding tour generator 218 may utilize ordered groups of visualizations 230 to generate visualization paths 234 for onboarding tour 232. Visualization paths 234 represent a set of one or more visualization paths for onboarding tour 232. A visualization path indicates how a particular set of visualizations are related and grouped together to provide specific information to a user of business analytic application 220.

Moreover, onboarding tour generator 218 generates visual cues 236 for visualization paths 234. In other words, onboarding tour generator 218 generates a set of one or more visual cues 236 for each visualization of each respective visualization path in visualization paths 234. A visual cue is a visual aid, hint, or help that a user of onboarding tour 232 may utilize to explore and better understand the visualization corresponding to that particular visual cue. A visual cue may be, for example, a graphic, image, text, interactive icon, or the like. Onboarding tour generator 218 embeds visual cues 236 in the corresponding visualizations of visualization paths 234.

As a result, data processing system 200 operates as a special purpose computer system in which onboarding tour generator 218 in data processing system 200 enables automatic generation of onboarding tours for business analytic applications. In particular, onboarding tour generator 218 transforms data processing system 200 into a special purpose computer system as compared to currently available general computer systems that do not have onboarding tour generator 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 238 is located in a functional form on computer readable media 240 that is selectively removable and may be loaded onto or transferred to data processing system 200 for running by processor unit 204. Program code 238 and computer readable media 240 form computer program product 242. In one example, computer readable media 240 may be computer readable storage media 244 or computer readable signal media 246. Computer readable storage media 244 may include, for example, an optical or magnetic disc that is inserted or placed into a drive or other device that is part of persistent storage 208 for transfer onto a storage device, such as a hard drive, that is part of persistent storage 208. Computer readable storage media 244 also may take the form of a persistent storage, such as a hard drive, a thumb drive, or a flash memory that is connected to data processing system 200. In some instances, computer readable storage media 244 may not be removable from data processing system 200.

Alternatively, program code 238 may be transferred to data processing system 200 using computer readable signal media 246. Computer readable signal media 246 may be, for example, a propagated data signal containing program code 238. For example, computer readable signal media 246 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 238 may be downloaded over a network to persistent storage 208 from another device or data processing system through computer readable signal media 246 for use within data processing system 200. For instance, program code stored in a computer readable storage media in a data processing system may be downloaded over a network from the data processing system to data processing system 200. The data processing system providing program code 238 may be a server computer, a client computer, or some other device capable of storing and transmitting program code 238.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 244 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Business analytic applications are getting more sophisticated over time. Entities, such as, for example, enterprises and organizations, invest a lot of time and effort in designing and building these business analytic applications for their users to be able to properly analyze and understand the data. As the capabilities of business analytic tools grow, so will the complexity of business analytic applications (e.g., dashboards and reports) that are built with these business analytic tools. As a result, users are finding it more and more difficult to learn how to properly analyze the data using a business analytic application.

A common way to tackle this problem in complex business analytic applications is by providing onboarding tours within the applications that help users explore the capabilities of these applications incrementally. These onboarding tours typically consist of visual cues that guide the users through specific flows in the applications. Although business analytic tools can theoretically introduce the ability for customers to build their own custom onboarding tours for their applications, which is often a complex task because visual cues are manually added by the customers to their applications. This makes the custom onboarding tours costly to build and difficult to maintain. As a result, onboarding tours of business analytic applications can be restricted to trivial or common flows and may not guide the user through the data analysis.

Illustrative embodiments automatically generate custom user onboarding tours for business analytic applications. Illustrative embodiments analyze columns of a dataset corresponding to a business analytic application, which includes determining which columns of the dataset are used by the business analytic application, determining which columns are of interest based on defined criteria, determining which columns are related to each other, and determining which columns influence other columns. In addition, illustrative embodiments analyze characteristics of visualizations of the business analytic application, which includes determining which visualizations are grouped together in the application and determining which visualizations share visual and layout characteristics, attributes, or features, are part of the same connection group, or are part of a same drill-through sequence. Further, illustrative embodiments automatically generate the onboarding tour for users of the business analytic application based on a result of the analysis of the columns and visualization characteristics corresponding to the business analytic application.

As a result, illustrative embodiments are capable of building a custom onboarding tour for a business analytic application. The automatically generated custom onboarding tour guides users in exploring, for example, a dashboard or report. Consequently, illustrative embodiments are capable of tailoring data and visualizations to a user on a daily basis.

Furthermore, illustrative embodiments are capable of generating learning paths based on the user's data and which visualizations are used together to provide personalized guidance to the user. Moreover, illustrative embodiments are capable of providing a personalized onboarding tour based on the particular business analytic application the user is interacting with at the moment. Thus, illustrative embodiments are capable of teaching users how to properly use and gain insights from any business analytic application.

Illustrative embodiments generate the onboarding tour for users based on an analysis of the dataset and the visualizations corresponding to the business analytic application. Each path of the onboarding tour represents a guided analysis of certain data columns through the visualizations that represent the data columns used by the business analytic application. When a new user opens a dashboard or a report for the first time, the onboarding tour guides the user through different visualization paths by presenting visual cues next to each visualization that is relevant to that path.

Illustrative embodiments can analyze the columns of the dataset corresponding to the business analytic application. Illustrative embodiments can filter out columns of the dataset that are not used in the visualizations of the business analytic application. In addition, illustrative embodiments can determine which columns of the dataset used by the business analytic application are of interest based on predefined criteria (e.g., the predefined criteria identifies revenue as an interesting column, whereas quarter is not identified as an interesting column), which columns are related (e.g., city and country columns are related), and which columns influence other columns (e.g., cost column influences profit column). Illustrative embodiments can thus utilize the relationships between the various columns, as well as an interestingness score of columns, to generate a relationship graph for the columns of the dataset used in the visualizations of the business analytic application.

Further, illustrative embodiments can analyze characteristics of visualizations of the business analytic application to determine: visualizations that are part of an explicit visual layout group (e.g., part of the same tab or part of the same visual group in a tab); visualizations that are part of an implicit visual group such as those that share similar visual and layout characteristics (e.g., visualizations that share a common color palette or scheme that is different from other visualization color palettes or visualizations that are of the same size and are located on the same row or column of visualizations); visualizations that are part of the same connection group (e.g., visualizations are part of the same connection group when actions, such as filtering, synchronize across all visualizations of the same connection group); and visualizations that are part of the same drill-through sequence (e.g., mouse clicking on one visualization navigates the business analytic application to another visualization in the same drill-through sequence). Furthermore, illustrative embodiments extract text from column labels, tool titles, tab titles, and application title and perform a lexical analysis and concept classification via lexical clues to determine ontological concepts corresponding to visualizations, individually or as a group, in the business analytic application.

Illustrative embodiments can also generate visualization paths for the business analytic application by determining ordered visualization groups. Illustrative embodiments assign relationship scores to visualizations based on the results of the analysis of the characteristics of the visualizations of the business analytic application. For example, for any two visualizations in a visualization group, illustrative embodiments assign a relationship score based on shared properties (e.g., the relationship scores of two visualizations that belong to the same application tab and are part of the same connection group are higher than the relationship scores of two visualizations that only belong to the same application tab). In addition, illustrative embodiments assign different weights to visualizations during the scoring process (e.g. visualizations that are part of the same connection group may be assigned a higher weight resulting in a higher relationship score rather than visualizations that are merely vertically aligned in a particular application tab).

Further, illustrative embodiments can adjust relationship scores of visualizations based on the results of the analysis dataset columns corresponding to the business analytic application. For example, a visualization that shares columns or ontological concepts of columns with another visualization (e.g., visualizations sharing the column "revenue" or sharing the same column ontological concept such as "city" and "metropolis") will have a higher relationship score and a greater degree or strength of relationship between the visualizations. A visualization with columns that are related to columns of another visualization (e.g., column "net profit" of one visualization and column "profit" of another visualization are related as belonging to the same ontological hierarchy) will have a higher relationship score and a greater degree of relationship between the visualizations. A visualization representing a column that is influenced by a column represented by another visualization (e.g., column "profit" of one visualization is influenced by column "cost" of another visualization) will have a higher relationship score and a greater degree of relationship between the visualizations. Furthermore, illustrative embodiments group visualizations based on the degree, level, or strength of the relationship between visualizations indicated by their corresponding relationship scores.

Moreover, illustrative embodiments can order visualizations within a respective group of visualizations based on a result of the analysis of the characteristics of the visualizations of the business analytic application. For example, a visualization's order in a drill-through sequence is factored into its rank within the group (e.g., a visualization that is first in a drill-through sequence will have a higher rank within a respective group of visualizations). A visualization's relative position to another visualization within the business analytic application is factored into its rank within the group (e.g., a visualization that is vertically positioned above another visualization in the same application tab will have a higher rank within a respective group of visualizations).

Illustrative embodiments can also reorder visualizations within a respective group of visualizations based on a result of the analysis of the columns of the dataset corresponding to the business analytic application. For example, interesting columns of visualizations and their corresponding interestingness scores are factored into the ordering of the visualizations within the group (e.g., a visualization corresponding to a column having a higher interestingness score will have a higher rank within that particular group of visualizations as opposed to a visualization corresponding to a column having a lower interestingness score). Also, the influence that a column of one visualization has on a column of another visualization is factored into the ordering of both visualizations (e.g., a visualization representing a column that influences a column represented by another visualization will have a higher rank within that particular group of visualizations).

In addition, illustrative embodiments can generate visual cues for each visualization path within the business analytic application. Each visualization path includes a set of one or more visual cues that explain to a user what the visualizations in a particular visualization path are about and how to interact with the visualizations in that path. Illustrative embodiments also generate text for each visual cue in the set of visual cues for each particular visualization path. For example, illustrative embodiments identify the ontological concepts of the visualizations corresponding to a particular group of visualizations based on column interestingness scores and occurrence in the visualizations (e.g., multiple visualizations in the group correspond to the column "revenue"). Illustrative embodiments then analyze the relationships between the ontological concepts used in the visualizations. Further, illustrative embodiments perform a lexical analysis on the column topic text found in the visualizations of that particular group. Illustrative embodiments automatically generate the text for the visual cues from the column topic and ontological concepts in that particular visualization path by employing natural language generation (e.g., illustrative embodiments generate "explore the revenue in different geographic locations" from the column topic "revenue" and its usage in visualizations having different geographical columns).

Illustrative embodiments can combine the different visualization paths into an onboarding tour for the business analytic application. Illustrative embodiments order the different visualization paths based on the lexical analysis of the ontological concepts in a particular visualization path, as well as the prominence of that particular visualization path in the business analytic application. This is similar to the process of ordering and reordering visualizations in a group of visualizations. Optionally, illustrative embodiments may show the visual cues in order of importance of that particular visualization path.

In an alternative illustrative embodiment, customers can modify onboarding tours corresponding to their own business analytic applications prior to publishing the onboarding tours to the end users. Modifications to onboarding tours may include, for example, editing the text of visual cues, adding, removing, or reordering visualizations in the visualization paths, and the like. In yet another alternative illustrative embodiment, visualization paths and onboarding tours are adjusted by learning from usage within the system.

Thus, illustrative embodiments can provide one or more technical solutions that overcome a technical problem with understanding data analysis provided by complex business analytic applications. As a result, these one or more technical solutions provide a technical effect and practical application in the field of analytics software.

Figure 3:
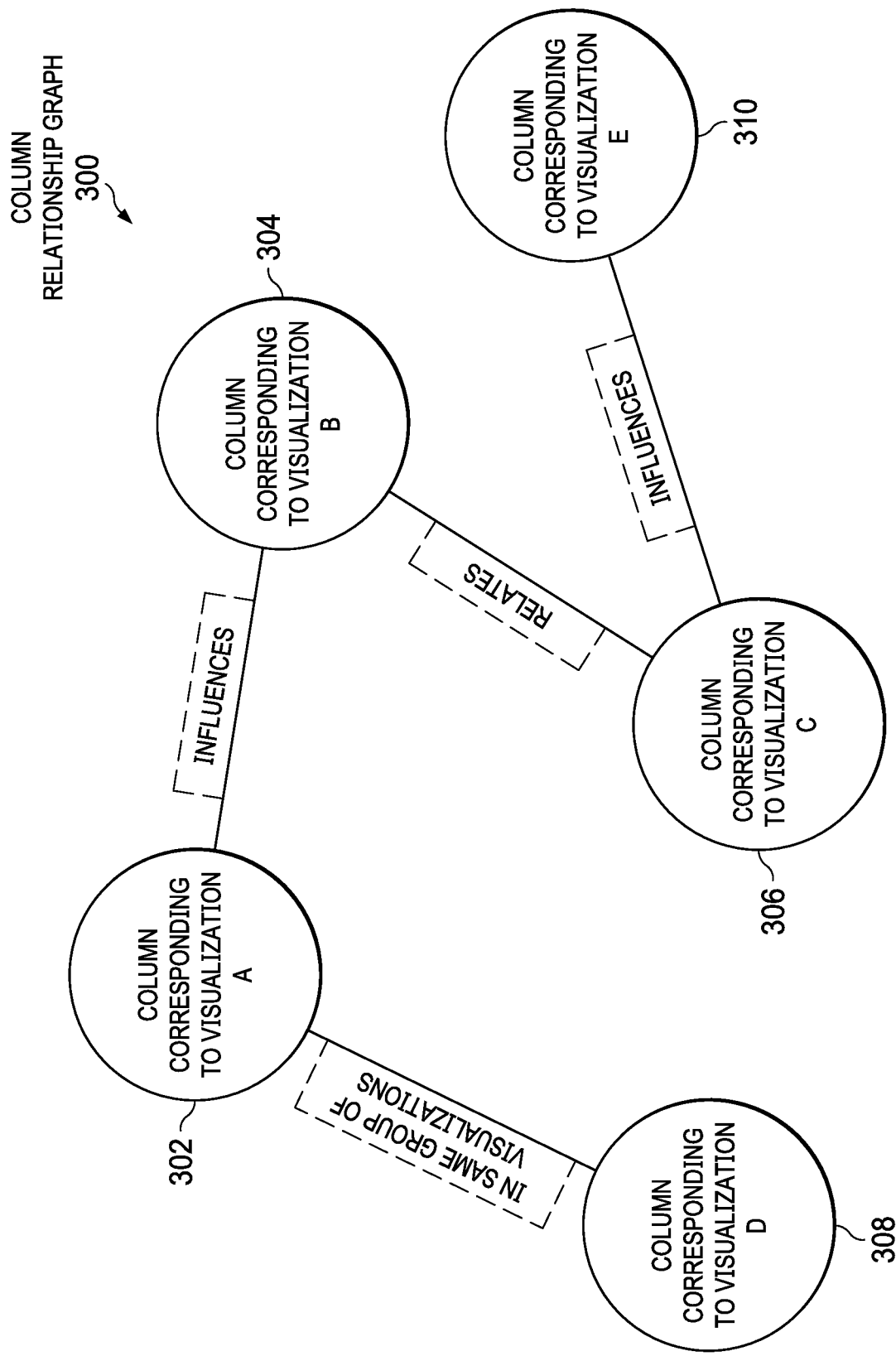
FIG. 3 is a diagram illustrating an example of a column relationship graph in accordance with an illustrative embodiment.

With reference now to FIG. 3, a diagram illustrating an example of a column relationship graph is depicted in accordance with an illustrative embodiment. Column relationship graph 300 may be implemented in a computer, such as, for example, server 104 in FIG. 1 or data processing system 200 in FIG. 2. Column relationship graph 300 shows relationships between columns of a dataset used by a business analytic application, such as, for example, business analytic application 220 in FIG. 2.

In this example, column relationship graph 300 includes column corresponding to visualization A 302, column corresponding to visualization B 304, column corresponding to visualization C 306, column corresponding to visualization D 308, and column corresponding to visualization E 310. However, it should be noted that column relationship graph 300 may include any number of columns corresponding to different visualizations. Column corresponding to visualization A 302, column corresponding to visualization B 304, column corresponding to visualization C 306, column corresponding to visualization D 308, and column corresponding to visualization E 310 may be, for example, columns in columns 228 of dataset 226 in FIG. 2, which are used by the business analytic application.

In this example, column relationship graph 300 indicates that the column corresponding to visualization A 302 is included in a same group of visualizations as the column corresponding to visualization D 308. In addition, column relationship graph 300 indicates that the column corresponding to visualization A 302 influences the column corresponding to visualization B 304. Further, column relationship graph 300 indicates that the column corresponding to visualization B 304 relates to the column corresponding to visualization C 306. Furthermore, column relationship graph 300 indicates that the column corresponding to visualization C 306 influences the column corresponding to visualization E 310.

Figure 4:
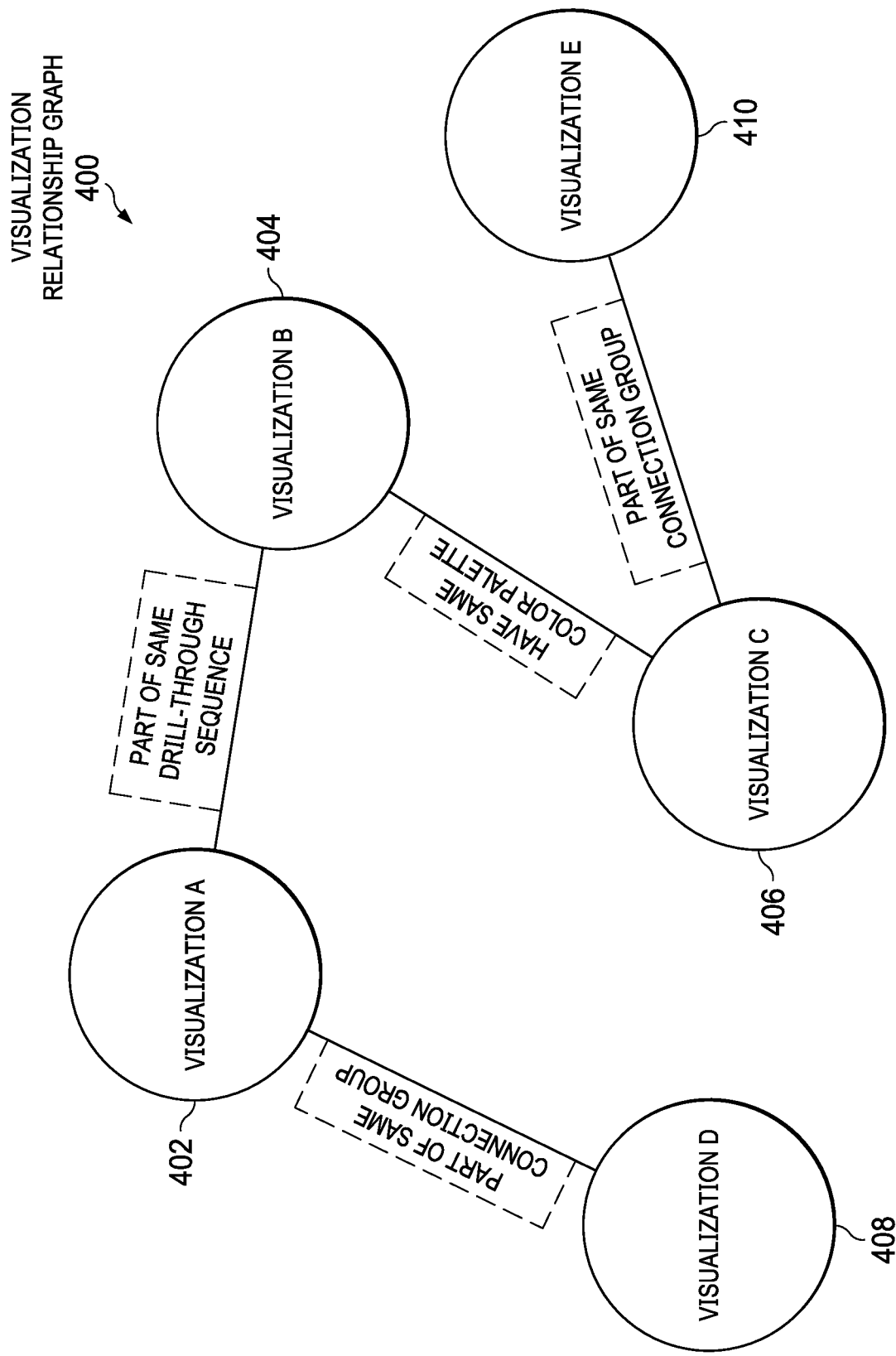
FIG. 4 is a diagram illustrating an example of a visualization relationship graph in accordance with an illustrative embodiment.

With reference now to FIG. 4, a diagram illustrating an example of a visualization relationship graph is depicted in accordance with an illustrative embodiment. Visualization relationship graph 400 may be implemented in a computer, such as, for example, server 104 in FIG. 1 or data processing system 200 in FIG. 2. Visualization relationship graph 400 shows relationships between visualizations of a business analytic application, such as, for example, business analytic application 220 in FIG. 2.

In this example, visualization relationship graph 400 includes visualization A 402, visualization B 404, visualization C 406, visualization D 408, and visualization E 410. However, it should be noted that visualization relationship graph 400 may include any number of different visualizations. Visualization A 402, visualization B 404, visualization C 406, visualization D 408, and visualization E 410 may be, for example, visualizations in visualizations 222 in FIG. 2, which represent information contained in corresponding columns of a dataset used by the business analytic application.

In this example, visualization relationship graph 400 indicates that visualization A 402 is part of the same connection group as visualization D 408. A same connection group of visualizations is an author-defined group of related visualizations that when a user applies an action, such as filtering, to one visualization in the group, the action highlights only those visualizations included in that particular connection group of visualizations. Visualization relationship graph 400 also indicates that visualization A 402 is part of the same drill-through sequence as visualization B 404. Further, visualization relationship graph 400 indicates that visualization B 404 has the same color palette as visualization C 406. Furthermore, visualization relationship graph 400 indicates that visualization C 406 is part of the same connection group as visualization E 410.

Figure 5:
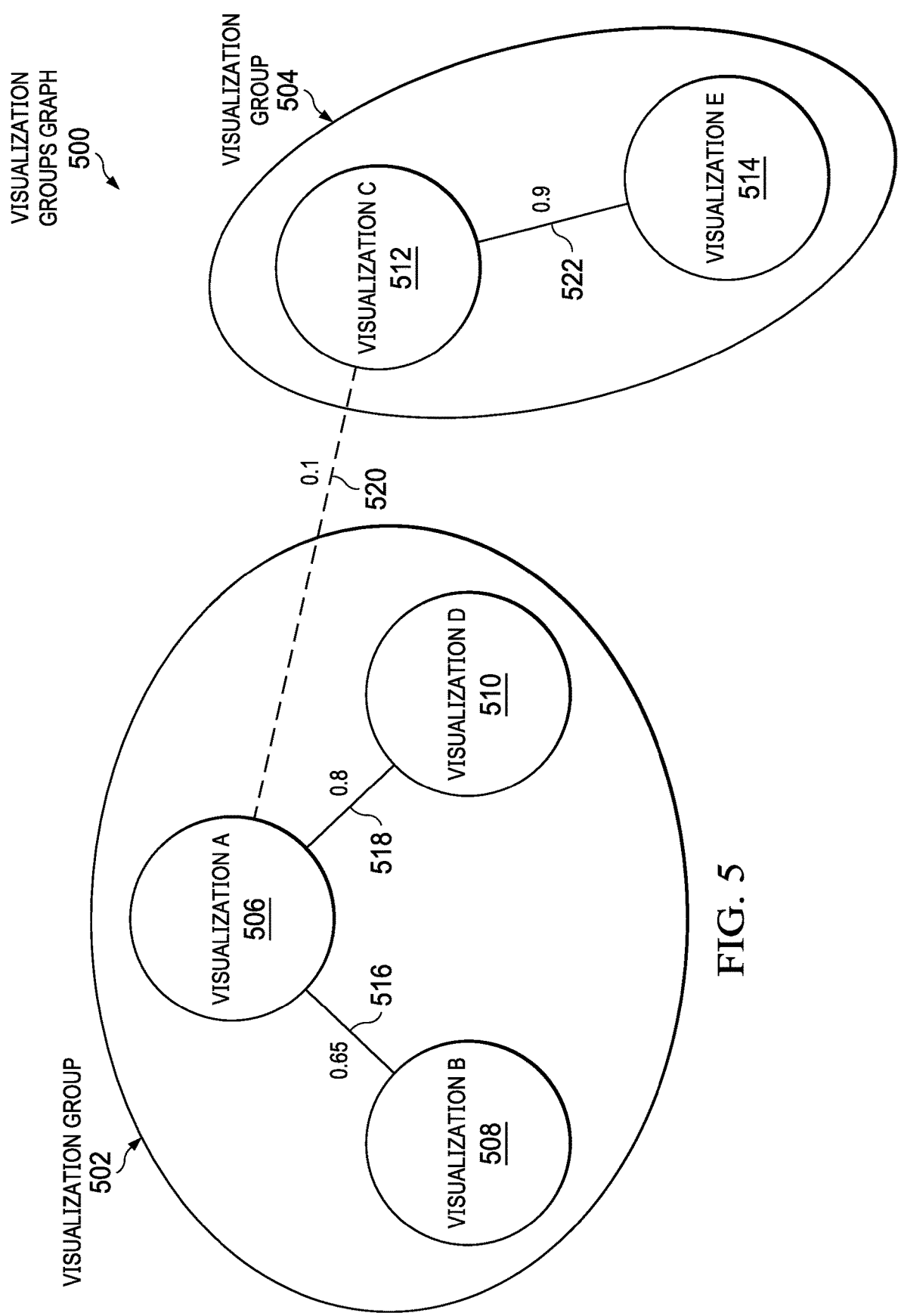
FIG. 5 is a diagram illustrating an example of a visualization groups graph in accordance with an illustrative embodiment.

With reference now to FIG. 5, a diagram illustrating an example of a visualization groups graph is depicted in accordance with an illustrative embodiment. Visualization groups graph 500 may be implemented in a computer, such as, for example, server 104 in FIG. 1 or data processing system 200 in FIG. 2. Visualization groups graph 500 shows sets of visualizations corresponding to a business analytic application, such as, for example, business analytic application 220 in FIG. 2, which are grouped together based on relationship scores.

In this example, visualization groups graph 500 includes visualization group 502 and visualization group 504. Visualization group 502 includes visualization A 506, visualization B 508, and visualization D 510. Visualization group 504 includes visualization C 512 and visualization E 514. Visualization A 506, visualization B 508, visualization C 512, visualization D 510, and visualization E 514 may be, for example, visualization A 402, visualization B 404, visualization C 406, visualization D 408, and visualization E 410 in FIG. 4. However, it should be noted that visualization groups graph 500 may include any number of different visualization groups and that each visualization group may include any number of visualizations.

Visualization groups graph 500 indicates that visualization A 506 and visualization B 508 have relationship score 516 of "0.65", which may be because visualization A 506 and visualization B 508 are part of the same drill-through sequence, for example. Visualization groups graph 500 also indicates that visualization A 506 and visualization D 510 have relationship score 518 of "0.8", which may be because visualization A 506 and visualization D 510 are part of the same connection group, for example. As a result, visualization A 506, visualization B 508, and visualization D 510 are included in the same visualization group (i.e., visualization group 502).

In addition, visualization groups graph 500 indicates that visualization A 506 and visualization C 512 have relationship score 520 of only "0.1", which may be because visualization A 506 and visualization C 512 may not have any direct relationship with each other. As a result, visualization A 506 and visualization C 512 are not included in the same visualization group. Further, visualization groups graph 500 indicates that visualization C 512 and visualization E 514 have relationship score 522 of "0.9", which may be because visualization C 512 and visualization E 514 are part of the same connection group, for example. As a result, visualization C 512 and visualization E 514 are included in the same visualization group (i.e., visualization group 504).

Figure 6:
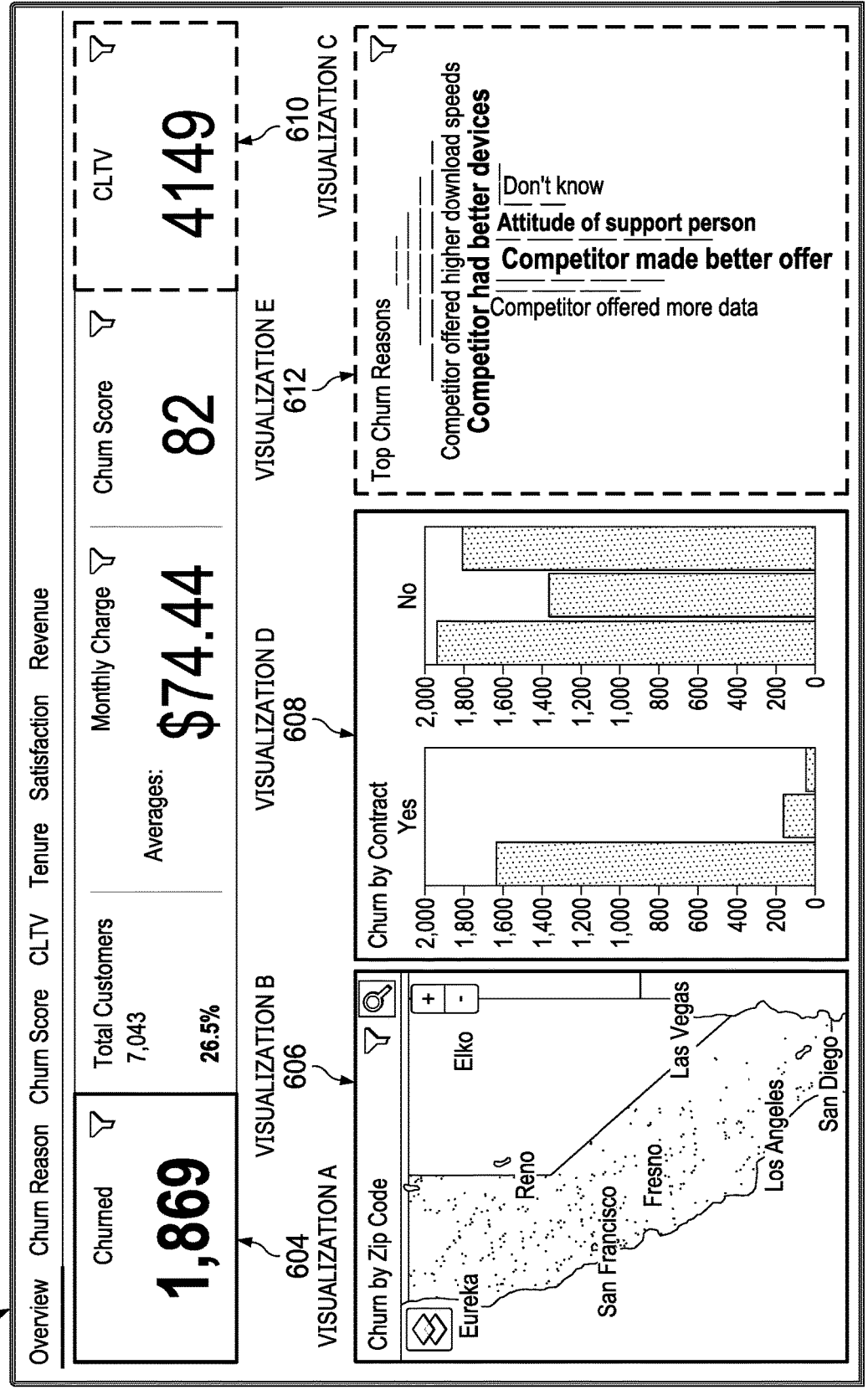
FIG. 6 is a diagram illustrating an example of an interface of a business analytic application in accordance with an illustrative embodiment.

With reference now to FIG. 6 is a diagram illustrating an example of an interface of a business analytic application as depicted in accordance with an illustrative embodiment. Business analytic application 600 may be implemented in a client device, such as, for example, client 110 in FIG. 1. Business analytic application 600 displays different sets of visualizations to a user of the client device.

In this example, business analytic application 600 includes tab 602 "Overview". Business analytic application 600 also includes tabs "Churn Reason", "Churn Score", "CLTV", "Tenure", "Satisfaction", and "Revenue". However, it should be noted that business analytic application 600 may include any number and type of application tabs.

In this example, tab 602 "Overview" includes visualization A 604 "Churned", visualization B 606 "Churn by Zip Code", visualization D 608 "Churn by Contract", visualization C 610 "CLTV" (i.e., Customer Lifetime Value), and visualization E 612 "Top Churn Reasons". Visualization A 604, visualization B 606, visualization D 608, visualization C 610, and visualization E 612 may be, for example, visualization A 506, visualization B 508, visualization D 510, visualization C 512, and visualization E 514 in FIG. 5. In addition, visualization A 604, visualization B 606, and visualization D 608 are included in one visualization group, such as, for example, visualization group 502 in FIG. 5, and visualization C 610 and visualization E 612 are included in another visualization group, such as, for example, visualization group 504 in FIG. 5.

Figure 7:
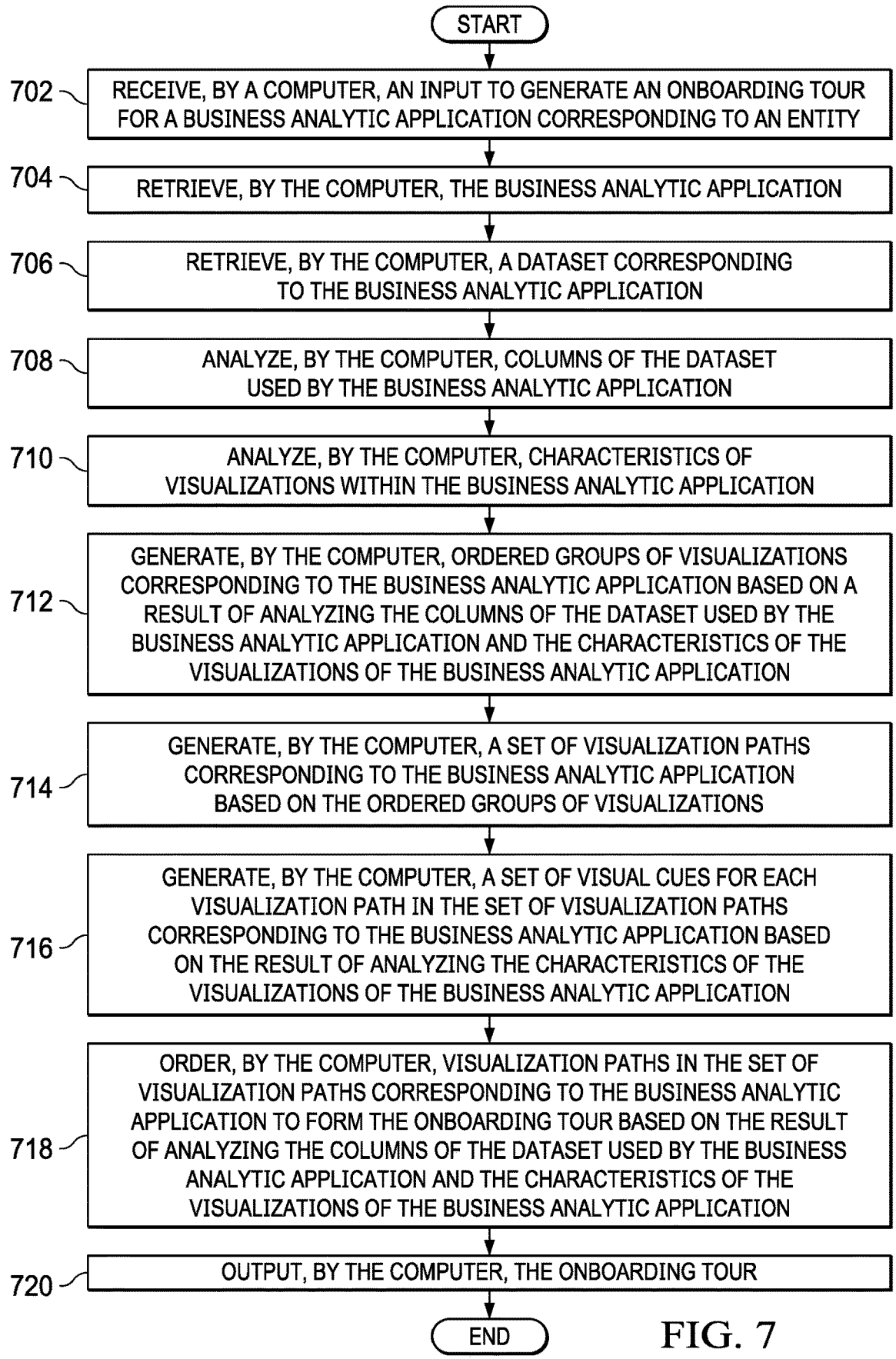
FIG. 7 is a flowchart illustrating a process for generating an onboarding tour corresponding to a business analytic application in accordance with an illustrative embodiment.

With reference now to FIG. 7, a flowchart illustrating a process for generating an onboarding tour corresponding to a business analytic application is shown in accordance with an illustrative embodiment. The process shown in FIG. 7 may be implemented in a computer, such as, for example, server 104 in FIG. 1 or data processing system 200 in FIG. 2.

The process begins when the computer receives an input to generate an onboarding tour for a business analytic application corresponding to an entity (operation 702). In response to receiving the input to generate the onboarding tour in operation 702, the computer retrieves the business analytic application (operation 704). In addition, the computer retrieves a dataset corresponding to the business analytic application (operation 706).

The computer analyzes columns of the dataset used by the business analytic application (operation 708). Further, the computer analyzes characteristics of visualizations of the business analytic application (operation 710). The computer generates ordered groups of visualizations corresponding to the business analytic application based on a result of analyzing the columns of the dataset used by the business analytic application and the characteristics of the visualizations of the business analytic application (operation 712).

The computer generates a set of visualization paths corresponding to the business analytic application based on the ordered groups of visualizations (operation 714). Further, the computer generates a set of visual cues for each visualization path in the set of visualization paths corresponding to the business analytic application based on the result of analyzing the characteristics of the visualizations of the business analytic application (operation 716). The computer orders visualization paths in the set of visualization paths corresponding to the business analytic application to form the onboarding tour based on the result of analyzing the columns of the dataset used by the business analytic application and the characteristics of the visualizations of the business analytic application (operation 718). The computer outputs the onboarding tour (operation 720). Thereafter, the process terminates.

Figure 8:
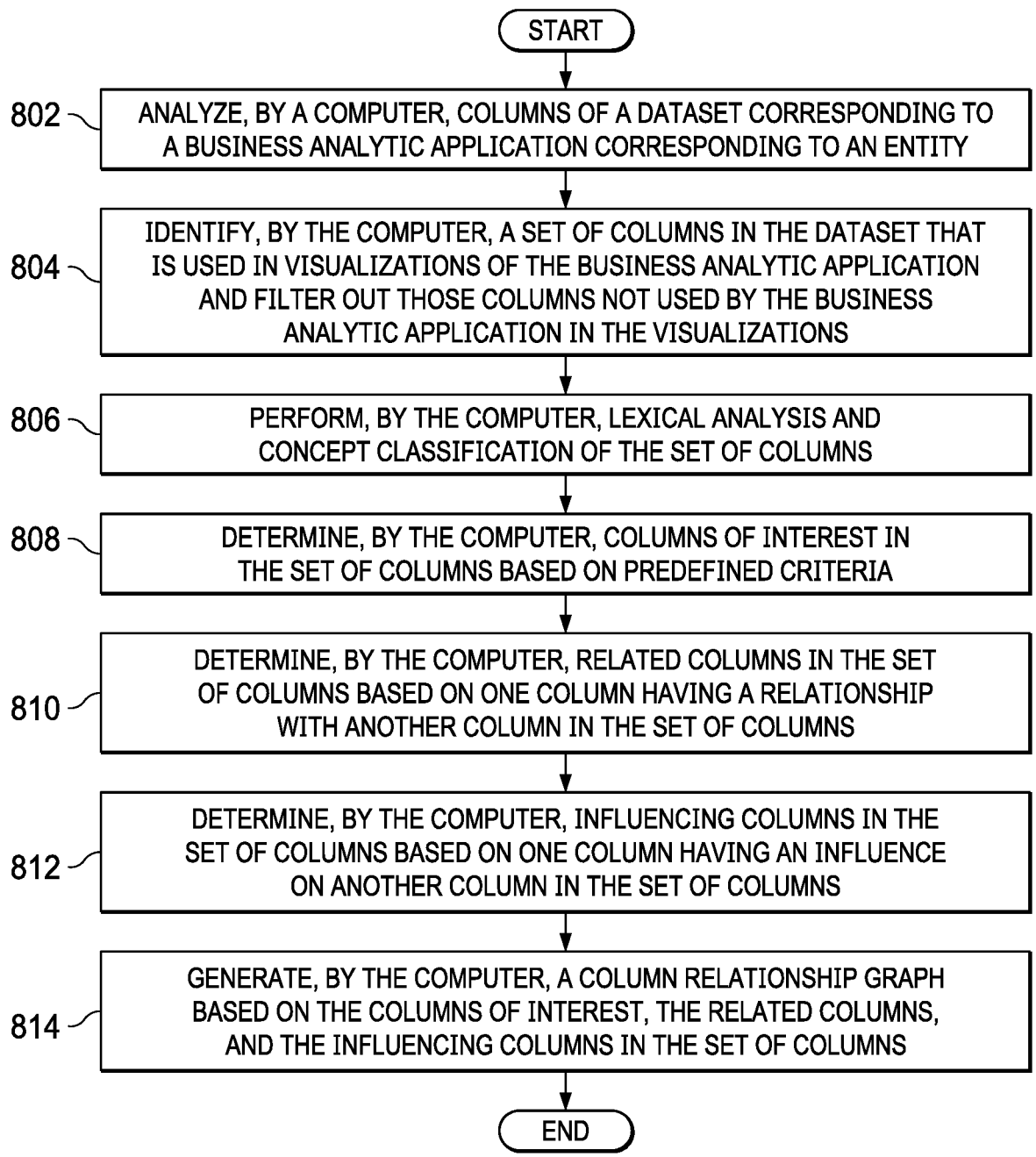
FIG. 8 is a flowchart illustrating a process for analyzing columns of a dataset corresponding to a business analytic application in accordance with an illustrative embodiment.

With reference now to FIG. 8, a flowchart illustrating a process for analyzing columns of a dataset corresponding to a business analytic application is shown in accordance with an illustrative embodiment. The process shown in FIG. 8 may be implemented in a computer, such as, for example, server 104 in FIG. 1 or data processing system 200 in FIG. 2.

The process begins when the computer analyzes columns of a dataset corresponding to a business analytic application corresponding to an entity (operation 802). The computer identifies a set of columns in the dataset that is used in visualizations of the business analytic application and filters out those columns not used by the business analytic application in the visualizations (operation 804). In addition, the computer performs lexical analysis and concept classification of the set of columns (operation 806).

In response to performing the lexical analysis and concept classification of the set of columns in operation 806, the computer determines columns of interest in the set of columns based on predefined criteria (operation 808), the computer determines related columns in the set of columns based on one column having a relationship with another column in the set of columns (operation 810), and the computer determines influencing columns in the set of columns based on one column having an influence on another column in the set of columns (operation 812).

Afterward, the computer generates a column relationship graph based on the columns of interest, the related columns, and the influencing columns in the set of columns (operation 814). Thereafter, the process terminates.

Figure 9:
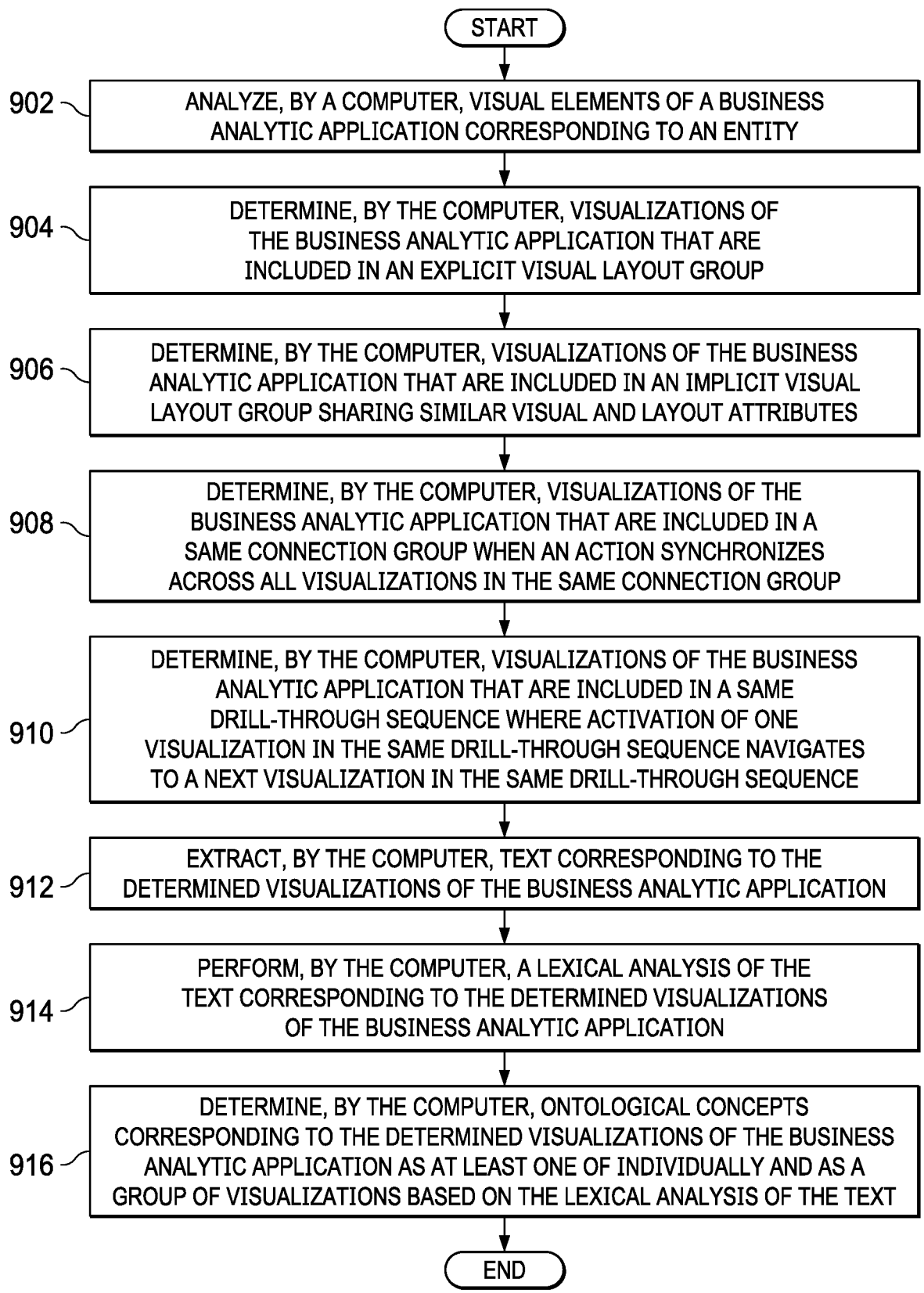
FIG. 9 is a flowchart illustrating a process for analyzing the visualization characteristics of a business analytic application in accordance with an illustrative embodiment.

With reference now to FIG. 9, a flowchart illustrating a process for analyzing the visualization characteristics of a business analytic application is shown in accordance with an illustrative embodiment. The process shown in FIG. 9 may be implemented in a computer, such as, for example, server 104 in FIG. 1 or data processing system 200 in FIG. 2.

The process begins when the computer analyzes characteristics of visualizations of a business analytic application corresponding to an entity (operation 902). In response to analyzing the characteristics of the visualizations of the business analytic application in operation 902, the computer determines those visualizations of the business analytic application that are included in an explicit visual layout group (operation 904), the computer determines those visualizations of the business analytic application that are included in an implicit visual layout group sharing similar visual and layout characteristics (operation 906), the computer determines those visualizations of the business analytic application that are included in a same connection group when an action synchronizes across all visualizations in that same connection group (operation 908), and the computer determines those visualizations of the business analytic application that are included in a same drill-through sequence where activation of one visualization in that same drill-through sequence navigates to a next visualization in that same drill-through sequence (operation 910).

Afterward, the computer extracts text corresponding to the determined visualizations of the business analytic application (operation 912). In addition, the computer performs a lexical analysis of the text corresponding to the determined visualizations of the business analytic application (operation 914). Further, the computer determines ontological concepts corresponding to the determined visualizations of the business analytic application as at least one of individually and as a group of visualizations based on the lexical analysis of the text (operation 916). Thereafter, the process terminates.

Figure 10:
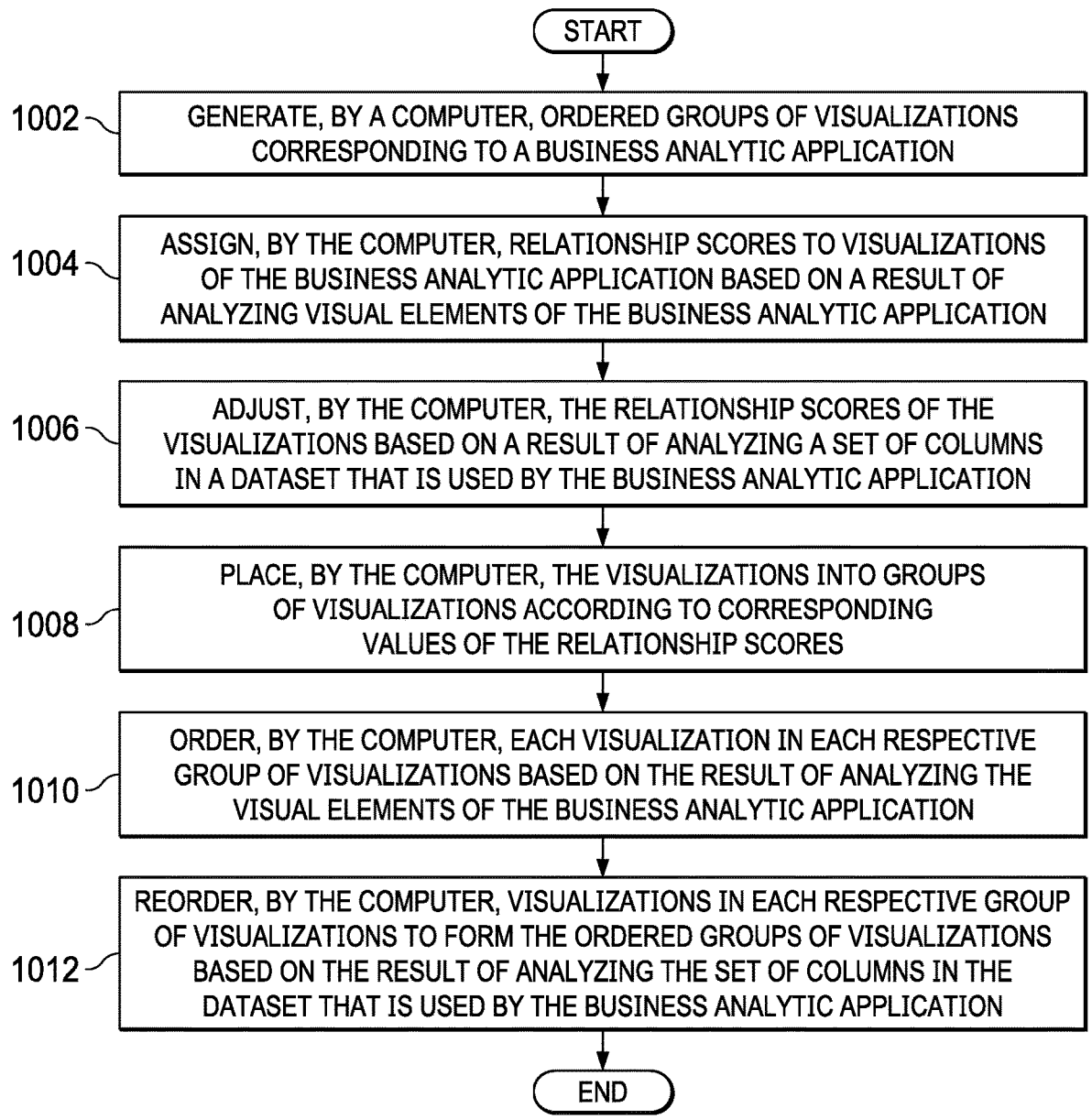
FIG. 10 is a flowchart illustrating a process for generating ordered groups of visualizations corresponding to a business analytic application in accordance with an illustrative embodiment.

With reference now to FIG. 10, a flowchart illustrating a process for generating ordered groups of visualizations corresponding to a business analytic application is shown in accordance with an illustrative embodiment. The process shown in FIG. 10 may be implemented in a computer, such as, for example, server 104 in FIG. 1 or data processing system 200 in FIG. 2.

The process begins when the computer generates ordered groups of visualizations corresponding to a business analytic application (operation 1002). The computer assigns relationship scores to visualizations of the business analytic application based on a result of analyzing characteristics of visualizations of the business analytic application (operation 1004). Afterward, the computer adjusts the relationship scores of the visualizations based on a result of analyzing a set of columns in a dataset that is used by the business analytic application (operation 1006).

The computer places the visualizations into groups of visualizations according to corresponding values of the relationship scores (operation 1008). The computer then orders each visualization in each respective group of visualizations based on the result of analyzing the characteristics of the visualizations of the business analytic application (operation 1010). Furthermore, the computer reorders visualizations in each respective group of visualizations to form the ordered groups of visualizations based on the result of analyzing the set of columns in the dataset that is used by the business analytic application (operation 1012). Thereafter, the process terminates.

Thus, illustrative embodiments of the present disclosure provide a computer-implemented method, computer system, and computer program product for automatically generating onboarding tours for users of business analytic applications to better understand the data analysis presented by these business analytic applications. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automatically generating an onboarding tour for users of a business analytic application corresponding to an entity, the computer-implemented method comprising:

receiving, by a computer, an input to generate the onboarding tour for the users of the business analytic application corresponding to the entity to assist the users in exploring capabilities of the business analytic application and understanding data analysis provided by the business analytic application;

retrieving, by the computer responsive to receiving the input to generate the onboarding tour for the users of the business analytic application corresponding to the entity, the business analytic application corresponding to the entity and a dataset used by the business analytic application;

analyzing, by the computer responsive to retrieving the business analytic application and the dataset, columns of the dataset used by the business analytic application, wherein the dataset represents a collection of data corresponding to a particular domain associated with the entity;

analyzing, by the computer, characteristics of visualizations within the business analytic application, wherein the visualizations represent data corresponding to the columns of the dataset used by the business analytic application, and wherein the characteristics comprise one or more of: layout, style, position, interactivity, and grouping;

generating, by the computer, ordered groups of visualizations corresponding to the business analytic application based on a result of analyzing the columns of the dataset used by the business analytic application and the characteristics of the visualizations of the business analytic application;

generating, by the computer, a set of visualization paths corresponding to the business analytic application based on the ordered groups of visualizations;

generating, by the computer, a set of visual cues with text that explains to the users of the business analytic application what the visualizations are about and how to interact with the visualizations for each visualization path in the set of visualization paths corresponding to the business analytic application based on the result of analyzing the characteristics of the visualizations of the business analytic application, wherein the computer generates the text for each set of visual cues from extracted column label text and ontological concepts that correspond to each particular visualization path in the set of visualization paths utilizing natural language generation;

embedding, by the computer, the set of visual cues with the text that explains to the users of the business analytic application what the visualizations are about and how to interact with the visualizations in each visualization path in the set of visualization paths corresponding to the business analytic application;

ordering, by the computer, visualization paths in the set of visualization paths corresponding to the business analytic application to form the onboarding tour that includes the set of visual cues with the text that explains to the users of the business analytic application what the visualizations are about and how to interact with the visualizations based on the result of analyzing the columns of the dataset used by the business analytic application and the characteristics of the visualizations of the business analytic application; and outputting, by the computer via a network, the onboard tour that includes the set of visual cues with the text that explains to the users of the business analytic application what the visualizations are about and how to interact with the visualizations to the business analytic application on a client device that implements the business analytic application.

2. The computer-implemented method of claim 1 further comprising:

identifying, by the computer, a set of columns in the dataset that is used by the business analytic application in the visualizations of the business analytic application;

extracting, by the computer, text from column labels corresponding to the set of columns in the dataset that is used by the business analytic application in the visualizations of the business analytic application;

performing, by the computer, lexical analysis and concept classification of the text extracted from the column labels corresponding to the set of columns in the dataset that is used in the visualizations of the business analytic application;

determining, by the computer, columns of interest in the set of columns in the dataset that is used by the business analytic application based on predefined criteria;

determining, by the computer, related columns in the set of columns in the dataset that is used by the business analytic application based on one column having a relationship with another column in the set of columns in the dataset that is used by the business analytic application;

determining, by the computer, influencing columns in the set of columns in the dataset that is used by the business analytic application based on one column having an influence on another column in the set of columns in the dataset that is used by the business analytic application; and generating, by the computer, a column relationship graph based on the columns of interest, the related columns, and the influencing columns in the set of columns in the dataset that is used by the business analytic application.

3. The computer-implemented method of claim 1 further comprising:

determining, by the computer, those visualizations of the business analytic application that are included in an explicit visual layout group;

determining, by the computer, those visualizations of the business analytic application that are included in an implicit visual layout group sharing similar visual and layout characteristics;

determining, by the computer, those visualizations of the business analytic application that are included in a same connection group when an action synchronizes across all visualizations in that same connection group; and determining, by the computer, those visualizations of the business analytic application that are included in a same drill-through sequence where activation of one visualization in that same drill-through sequence navigates to a next visualization in that same drill-through sequence.

4. The computer-implemented method of claim 3 further comprising:

extracting, by the computer, text corresponding to the determined visualizations of the business analytic application;

performing, by the computer, a lexical analysis of the text corresponding to the determined visualizations of the business analytic application; and determining, by the computer, ontological concepts corresponding to the determined visualizations of the business analytic application as at least one of individually and as a group of visualizations based on the lexical analysis of the text.

5. The computer-implemented method of claim 1 further comprising:

assigning, by the computer, relationship scores to the visualizations of the business analytic application based on the result of analyzing the characteristics of visualizations of the business analytic application.

6. The computer-implemented method of claim 5 further comprising:

adjusting, by the computer, the relationship scores of the visualizations based on the computer performing lexical analysis of extracted column label text corresponding to a set of columns in the dataset that is used by the business analytic application.

7. The computer-implemented method of claim 6 further comprising:

placing, by the computer, the visualizations into groups of visualizations according to corresponding values of the relationship scores.

8. The computer-implemented method of claim 7 further comprising:

ordering, by the computer, each visualization in each respective group of visualizations based on the result of analyzing the characteristics of the visualizations of the business analytic application.

9. The computer-implemented method of claim 8 further comprising:

reordering, by the computer, visualizations in each respective group of visualizations to form the ordered groups of visualizations based on the computer performing the lexical analysis of the extracted column label text corresponding to the set of columns in the dataset that is used by the business analytic application.

10. A computer system for automatically generating an onboarding tour for users of a business analytic application corresponding to an entity, the computer system comprising:

a bus system;

a storage device connected to the bus system, wherein the storage device stores program instructions; and a processor connected to the bus system, wherein the processor executes the program instructions to:

receive an input to generate the onboarding tour for the users of the business analytic application corresponding to the entity to assist the users in exploring capabilities of the business analytic application and understanding data analysis provided by the business analytic application;

retrieve the business analytic application corresponding to the entity and a dataset used by the business analytic application in response to receiving the input to generate the onboarding tour for the users of the business analytic application corresponding to the entity;

analyze columns of the dataset used by the business analytic application in response to retrieving the business analytic application and the dataset, wherein the dataset represents a collection of data corresponding to a particular domain associated with the entity;

analyze characteristics of visualizations within the business analytic application, wherein the visualizations represent data corresponding to the columns of the dataset used by the business analytic application, and wherein the characteristics comprise one or more of: layout, style, position, interactivity, and grouping;

generate ordered groups of visualizations corresponding to the business analytic application based on a result of analyzing the columns of the dataset used by the business analytic application and the characteristics of the visualizations of the business analytic application;

generate a set of visualization paths corresponding to the business analytic application based on the ordered groups of visualizations;

generate a set of visual cues with text that explains to the users of the business analytic application what the visualizations are about and how to interact with the visualizations for each visualization path in the set of visualization paths corresponding to the business analytic application based on the result of analyzing the characteristics of the visualizations of the business analytic application, wherein the text for each set of visual cues is generated from extracted column label text and ontological concepts that correspond to each particular visualization path in the set of visualization paths utilizing natural language generation;

embed the set of visual cues with the text that explains to the users of the business analytic application what the visualizations are about and how to interact with the visualizations in each visualization path in the set of visualization paths corresponding to the business analytic application;

order visualization paths in the set of visualization paths corresponding to the business analytic application to form the onboarding tour that includes the set of visual cues with the text that explains to the users of the business analytic application what the visualizations are about and how to interact with the visualizations based on the result of analyzing the columns of the dataset used by the business analytic application and the characteristics of the visualizations of the business analytic application; and output, via a network, the onboard tour that includes the set of visual cues with the text that explains to the users of the business analytic application what the visualizations are about and how to interact with the visualizations to the business analytic application on a client device that implements the business analytic application.

11. The computer system of claim 10, wherein the processor further executes the program instructions to:

identify a set of columns in the dataset that is used by the business analytic application in the visualizations of the business analytic application;

extract text from column labels corresponding to the set of columns in the dataset that is used by the business analytic application in the visualizations of the business analytic application;

perform lexical analysis and concept classification of the text extracted from the column labels corresponding to the set of columns in the dataset that is used in the visualizations of the business analytic application;

determine columns of interest in the set of columns in the dataset that is used by the business analytic application based on predefined criteria;

determine related columns in the set of columns in the dataset that is used by the business analytic application based on one column having a relationship with another column in the set of columns in the dataset that is used by the business analytic application;

determine influencing columns in the set of columns in the dataset that is used by the business analytic application based on one column having an influence on another column in the set of columns in the dataset that is used by the business analytic application; and generate a column relationship graph based on the columns of interest, the related columns, and the influencing columns in the set of columns in the dataset that is used by the business analytic application.

12. The computer system of claim 10, wherein the processor further executes the program instructions to:

determine those visualizations of the business analytic application that are included in an explicit visual layout group;

determine those visualizations of the business analytic application that are included in an implicit visual layout group sharing similar visual and layout characteristics;

determine those visualizations of the business analytic application that are included in a same connection group when an action synchronizes across all visualizations in that same connection group; and determine those visualizations of the business analytic application that are included in a same drill-through sequence where activation of one visualization in that same drill-through sequence navigates to a next visualization in that same drill-through sequence.

13. The computer system of claim 12, wherein the processor further executes the program instructions to:

extract text corresponding to the determined visualizations of the business analytic application;

perform a lexical analysis of the text corresponding to the determined visualizations of the business analytic application; and determine ontological concepts corresponding to the determined visualizations of the business analytic application as at least one of individually and as a group of visualizations based on the lexical analysis of the text.

14. A computer program product for automatically generating an onboarding tour for users of a business analytic application corresponding to an entity, the computer program product comprising a computer readable storage medium having program instructions embodied therewith, the program instructions executable by a computer to cause the computer to perform a method comprising:

receiving, by the computer, an input to generate the onboarding tour for the users of the business analytic application corresponding to the entity to assist the users in exploring capabilities of the business analytic application and understanding data analysis provided by the business analytic application;

retrieving, by the computer responsive to receiving the input to generate the onboarding tour for the users of the business analytic application corresponding to the entity, the business analytic application corresponding to the entity and a dataset used by the business analytic application;

analyzing, by the computer responsive to retrieving the business analytic application and the dataset, columns of the dataset used by the business analytic application, wherein the dataset represents a collection of data corresponding to a particular domain associated with the entity;

analyzing, by the computer, characteristics of visualizations within the business analytic application, wherein the visualizations represent data corresponding to the columns of the dataset used by the business analytic application, and wherein the characteristics comprise one or more of: layout, style, position, interactivity, and grouping;

generating, by the computer, ordered groups of visualizations corresponding to the business analytic application based on a result of analyzing the columns of the dataset used by the business analytic application and the characteristics of the visualizations of the business analytic application;

generating, by the computer, a set of visualization paths corresponding to the business analytic application based on the ordered groups of visualizations;

generating, by the computer, a set of visual cues with text that explains to the users of the business analytic application what the visualizations are about and how to interact with the visualizations for each visualization path in the set of visualization paths corresponding to the business analytic application based on the result of analyzing the characteristics of the visualizations of the business analytic application, wherein the computer generates the text for each set of visual cues from extracted column label text and ontological concepts that correspond to each particular visualization path in the set of visualization paths utilizing natural language generation;

embedding, by the computer, the set of visual cues with the text that explains to the users of the business analytic application what the visualizations are about and how to interact with the visualizations in each visualization path in the set of visualization paths corresponding to the business analytic application;

ordering, by the computer, visualization paths in the set of visualization paths corresponding to the business analytic application to form the onboarding tour that includes the set of visual cues with the text that explains to the users of the business analytic application what the visualizations are about and how to interact with the visualizations based on the result of analyzing the columns of the dataset used by the business analytic application and the characteristics of the visualizations of the business analytic application; and outputting, by the computer via a network, the onboard tour that includes the set of visual cues with the text that explains to the users of the business analytic application what the visualizations are about and how to interact with the visualizations to the business analytic application on a client device that implements the business analytic application.

15. The computer program product of claim 14 further comprising:

identifying, by the computer, a set of columns in the dataset that is used by the business analytic application in the visualizations of the business analytic application;

extracting, by the computer, text from column labels corresponding to the set of columns in the dataset that is used by the business analytic application in the visualizations of the business analytic application;

performing, by the computer, lexical analysis and concept classification of the text extracted from the column labels corresponding to the set of columns in the dataset that is used in the visualizations of the business analytic application;

determining, by the computer, columns of interest in the set of columns in the dataset that is used by the business analytic application based on predefined criteria;

determining, by the computer, related columns in the set of columns in the dataset that is used by the business analytic application based on one column having a relationship with another column in the set of columns in the dataset that is used by the business analytic application;

determining, by the computer, influencing columns in the set of columns in the dataset that is used by the business analytic application based on one column having an influence on another column in the set of columns in the dataset that is used by the business analytic application; and generating, by the computer, a column relationship graph based on the columns of interest, the related columns, and the influencing columns in the set of columns in the dataset that is used by the business analytic application.

16. The computer program product of claim 14 further comprising:

determining, by the computer, those visualizations of the business analytic application that are included in an explicit visual layout group;

determining, by the computer, those visualizations of the business analytic application that are included in an implicit visual layout group sharing similar visual and layout characteristics;

determining, by the computer, those visualizations of the business analytic application that are included in a same connection group when an action synchronizes across all visualizations in that same connection group; and determining, by the computer, those visualizations of the business analytic application that are included in a same drill-through sequence where activation of one visualization in that same drill-through sequence navigates to a next visualization in that same drill-through sequence.

17. The computer program product of claim 16 further comprising:

extracting, by the computer, text corresponding to the determined visualizations of the business analytic application;

performing, by the computer, a lexical analysis of the text corresponding to the determined visualizations of the business analytic application; and determining, by the computer, ontological concepts corresponding to the determined visualizations of the business analytic application as at least one of individually and as a group of visualizations based on the lexical analysis of the text.

* * * * *